United States Patent
Gonzalez Tellez et al.

(10) Patent No.: US 11,951,435 B1
(45) Date of Patent: Apr. 9, 2024

(54) VAPOR SEPARATION SYSTEMS AND METHODS

(71) Applicant: GENERAL ELECTRIC COMPANY, Schenectady, NY (US)

(72) Inventors: Victor Alfonso Gonzalez Tellez, Queretaro (MX); Tho V. Nguyen, Houston, TX (US); Haitham J. Khamissi, Houston, TX (US); Oswaldo Alberto Sanchez Rubio, Queretaro (MX); Douglas A. Jones, Bellaire, TX (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 17/968,915

(22) Filed: Oct. 19, 2022

(51) Int. Cl.
  *B01D 5/00* (2006.01)
  *B01D 53/00* (2006.01)
  *F01M 13/04* (2006.01)

(52) U.S. Cl.
  CPC .......... *B01D 5/0051* (2013.01); *B01D 5/009* (2013.01); *B01D 53/002* (2013.01); *F01M 13/04* (2013.01); *B01D 2258/01* (2013.01); *F01M 2013/0411* (2013.01)

(58) Field of Classification Search
  CPC .. B01D 5/009; B01D 5/0051; B01D 2258/01; F01M 13/04; F01M 2013/0411
  See application file for complete search history.

(56) References Cited

U.S. PATENT DOCUMENTS

| | | | | |
|---|---|---|---|---|
| 2,726,519 A * | 12/1955 | Squier | ..................... | F25B 27/02 62/623 |
| 4,027,495 A * | 6/1977 | Edwards | .................... | F17C 7/02 62/282 |
| 4,050,237 A * | 9/1977 | Pall | ..................... | B01D 46/0031 55/486 |
| 5,732,766 A * | 3/1998 | Hunter | ............... | B01D 46/4263 165/113 |
| 5,784,875 A * | 7/1998 | Statler | ....................... | F23R 3/12 60/39.463 |
| 6,145,294 A * | 11/2000 | Traver | .................... | F02C 7/232 60/776 |
| 6,973,925 B2 | 12/2005 | Sauter et al. | | |
| 7,867,310 B2 * | 1/2011 | Baten | ....................... | B04C 5/12 55/455 |

(Continued)

FOREIGN PATENT DOCUMENTS

EP  3241998 A1  11/2017

*Primary Examiner* — Jonathan Miller
(74) *Attorney, Agent, or Firm* — Armstrong Teasdale LLP

(57) ABSTRACT

A vapor separation system including a cooler having an inlet configured to receive an air-oil-water mixture, and an outlet configured to discharge separated oil and water in two different phases of matter. A first sensor is at the outlet of the cooler. A controller is communicatively coupled to the cooler, wherein the controller is configured to receive temperature feedback from the first sensor, and increase or reduce the amount of cooling, with the cooler and based on the temperature feedback, the oil-water mixture to a separation temperature configured to liquefy at least a portion of the oil in the air-oil-water mixture, while maintaining at least a portion of the water in the air-oil-water mixture in a vaporized state.

17 Claims, 2 Drawing Sheets

(56) References Cited

U.S. PATENT DOCUMENTS

| | | | |
|---|---|---|---|
| 8,622,716 B2* | 1/2014 | Tanaka | F04B 53/08 |
| | | | 165/122 |
| 9,097,180 B2* | 8/2015 | Ekanayake | F02C 7/06 |
| 10,364,714 B2 | 7/2019 | Erdmann et al. | |
| 10,465,492 B2* | 11/2019 | Ricotta | C10L 3/101 |
| 10,646,805 B2 | 5/2020 | Beier et al. | |
| 10,688,426 B2 | 6/2020 | Peck et al. | |
| 2012/0285425 A1 | 11/2012 | Spix | |
| 2012/0304971 A1 | 12/2012 | Rice et al. | |
| 2017/0101991 A1* | 4/2017 | Yenneti | F04C 29/04 |
| 2018/0017062 A1* | 1/2018 | Peters | F04C 29/042 |
| 2019/0337715 A1 | 11/2019 | Ramandev et al. | |
| 2019/0344199 A1 | 11/2019 | Gates et al. | |
| 2020/0240291 A1 | 7/2020 | Sheridan | |
| 2020/0263610 A1 | 8/2020 | Alstad et al. | |
| 2020/0316506 A1 | 10/2020 | Pereira et al. | |

* cited by examiner

VAPOR SEPARATION SYSTEMS AND METHODS

BACKGROUND

The present disclosure relates generally to power generation systems and, more specifically, to systems and methods of separating mixtures of at least two fluids having similar specific gravities, while each have a unique vapor pressure.

Many known power plants use different turbine systems to generate power. Some of these turbine systems may be selectively activated and deactivated based on power demands at any given time, while other operate as base generators to keep the power grid demand sustained. For example, peaking turbine systems may be inactive during times of lower power usage, and then be activated during times of high power usage to augment power generated by the other turbine systems at the power plant or those coupled to the power grid. In turbine power generating systems, a lubricant such as synthetic lube oil facilitates the movement of the rotating mechanical parts of the turbine and also extracts the heat and provides cooling to the rotating elements. Water may be injected into the turbine to control exhaust emissions. Additionally, for power generation augmentation, water injection may be used in "sprint" power modes to increase the mass of the working fluid and, as a result, increase the power output of an open system in accordance with the first law of thermodynamics. In some instances, during operation, the synthetic lube oil and water may become mixed. At least some known fluid separators separate mixtures based on differing specific gravities of the components parts of the mixture. However, it may be challenging to separate mixtures into its substance parts using such separators when the mixture substance parts have similar specific gravities. Other known methods to separate a fluid-fluid mixture into its substance parts are also known such as viscosity or emulsion or surfaces tension based methods. Each of these known methods adds complexity to the process and may provide ineffective quick separation due to the time needed to perform the process.

As such, it would be desirable to produce a separation system that may be used reliably with mixtures that include substance parts that have similar specific gravities and which does not adversely affect the normal turbine operation.

BRIEF DESCRIPTION

In one aspect, a vapor separation system including a cooler having an inlet oriented to receive an air-oil-water vapor/mist mixture, and an outlet oriented to discharge liquid oil and vapor water from the cooler. A first sensor is at the outlet of the cooler. A controller is communicatively coupled to the cooler, wherein the controller is configured to receive temperature feedback from the first sensor, and cool, using the cooler and based on the temperature feedback, the air-oil-water mixture to a separation temperature that liquifies at least a portion of the oil in the air-oil-water mixture, while maintaining at least a portion of the water in the air-oil-water mixture in a vaporized state relying on the difference of the vapor pressure between both substances.

In another aspect, a gas turbine assembly including a lubrication system, and a mist/vapor separation system is provided. The vapor separation system includes a cooler having an inlet oriented to receive an air-oil-water vapor mixture, and an outlet oriented to discharge the liquid oil and water vapor. During operation, heat from the gas turbine produces the air-oil-water vapor/mist mixture. A first sensor is at the outlet of the cooler. A controller is communicatively coupled to the cooler, wherein the controller receives temperature feedback from the first sensor, and cools, with the cooler and based on the temperature feedback, the air-oil-water mixture to a separation temperature that, relying on the difference of the vapor pressure between both substances, causes at least a portion of the oil in the oil-water mixture to liquify, while maintaining at least a portion of the water in the air-oil-water mixture in a vaporized state.

In a further aspect, a vapor separation method includes channeling an air-oil-water mixture towards an inlet of a cooler, monitoring, with a first sensor, a temperature at an outlet of the cooler, receiving temperature feedback from the first sensor, and cooling, with the cooler and based on the temperature feedback, the air-oil-water mixture to a separation temperature configured to liquefy at least a portion of the oil in the entering oil-water mixture, and configured to maintain at least a portion of the water in the oil-water mixture in a vaporized state to be discharged out of the system.

DETAILED DESCRIPTION

The embodiments described herein relate to systems and methods of separating mixtures of at least two fluids that have similar specific gravities, but different vapor pressures, or that generally have different specific gravities and different vapor pressures. Additionally, the temperature at which the oil vapor separates efficiently from the air may be different from the temperature at which water vapor condenses to liquid. Specifically, the embodiments described herein disclose systems and methods for use in controlling the cooling of a mixture of water and oil in an air/oil separator. Controlling the cooling of the mixture enables condensation of one substance of the mixture to facilitate effectively separating the mixture into its liquid and gas parts.

Because water and the type of synthetic oils typically used in turbine lubrication have similar densities, other methods of separation such as, gravity and/or centrifugal separation, may be generally ineffective to separate such mixtures. Thus, the embodiments described herein use: 1) a method to determine cooler performance, based on sensor data, to predict the cooling at different ambient temperatures; 2) a conditioning system, such as a variable frequency drive unit, variable damper, on/off control, to selectively start and/or stop the cooler motor, and/or to operate the motor at different speeds; and 3) a control system capable of controlling the cooler outlet temperatures given the performance prediction from above, and be capable of determining an optimal temperature to facilitate cooling the mixture considering various environmental constraints (e.g., ambient temperature and/or altitude and its effect on the vapor point of water).

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
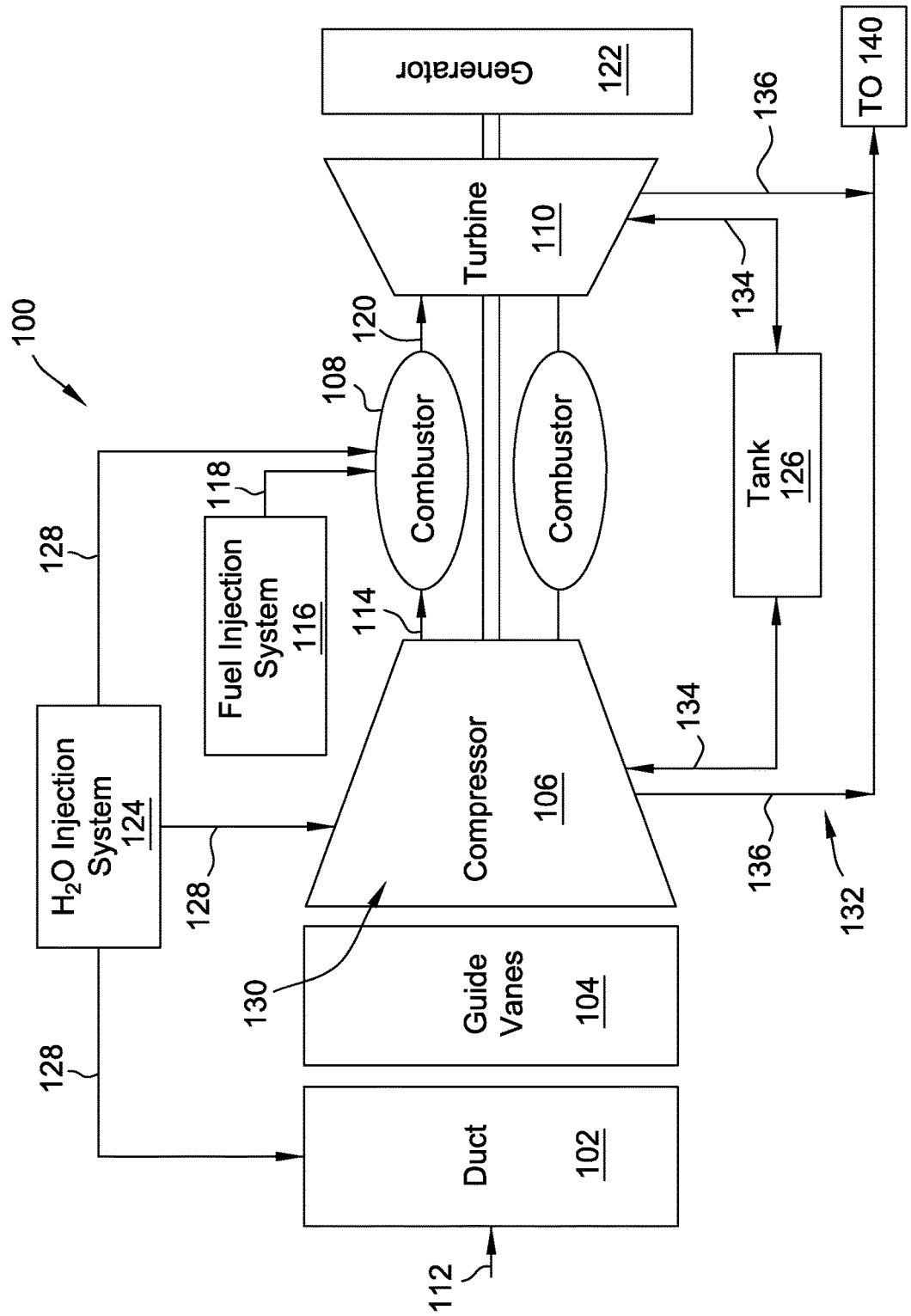
FIG. 1 is a schematic view of an exemplary gas turbine assembly.

FIG. 1 is a schematic illustration of an exemplary gas turbine assembly 100. In the exemplary embodiment, gas turbine assembly 100 includes an inlet duct 102, a stage 104 of compressor inlet guide vanes, a compressor 106, a combustor 108, and a turbine section 110 coupled in a serial and axial flow relationship. Intake air 112 is channeled through duct 102 and through stage 104 of inlet guide vanes, prior to it being directed towards compressor 106. Compressor 106 compresses intake air 112 and discharges compressed air 114 towards combustor 108. A fuel injection system 116 provides fuel 118 to combustor 108, and the resulting fuel-air mixture is ignited within combustor 108. Combustion gas 120 is discharged from combustor 108 and is directed towards turbine section 110 wherein the mass and thermal energy of combustion gas 120 is converted to work. A portion of the work is used to drive compressor 106, and the remaining balance is used to drive an electric generator 122 to generate electric power.

In the exemplary embodiment, gas turbine assembly 100 includes a water injection system 124 and a tank 126. Water injection system 124 is coupled in flow communication with compressor 106 or inlet duct 102 to selectively provide a flow of water 128 to compressor 106 based on the operating condition of gas turbine assembly 100. For example, water 128 may be discharged towards a main flow path 130 of gas turbine assembly 100, such as being injected into compressor 106 for use in controlling emissions and/or for power augmentation when gas turbine assembly 100 is operating at a sprint/peak firing mode. Gas turbine assembly 100 also includes a lubrication system 132 for use in lubricating the rotating parts of gas turbine assembly 100. Lubrication system 132 includes a tank 126 in flow communication with compressor 106 and turbine 110. Tank 126 is used to store a lubricating fluid 134 therein, such as synthetic lube oil. In one embodiment, the synthetic lube oil specific gravity may range from about 0.83 to about 1.05. In operation, lubricating fluid 134 is channeled between tank 126 and either compressor 106 and/or turbine 110. The lubrication system also includes an air/oil mist collection system which forwards this mixture to a separation system.

When the water injection system 124 is in use, water 128 may become undesirably mixed with the air/oil mist 136 in the turbine bearings. During normal turbine operation, this fluid mixture is heated by the turbine to a temperature above the vapor point of the water. This mixture is then channeled to the air/oil separation system 138 (shown on FIG. 2). With proper controls and operation, the mist separation system 138 can be used to separate the air-oil-water mixture 136 into its substance parts. In some embodiments, lubricating fluid 134 has a specific gravity that is approximately equal to or similar to that of water. In addition, lubricating fluid 134 generally has a lower vapor pressure than water. Accordingly, as will be described in more detail below, vapor separation system 138 facilitates controlling the cooling of oil-water vapor mixture 136 to facilitate the separation thereof into its substance parts in two distinct phases.

Figure 2:
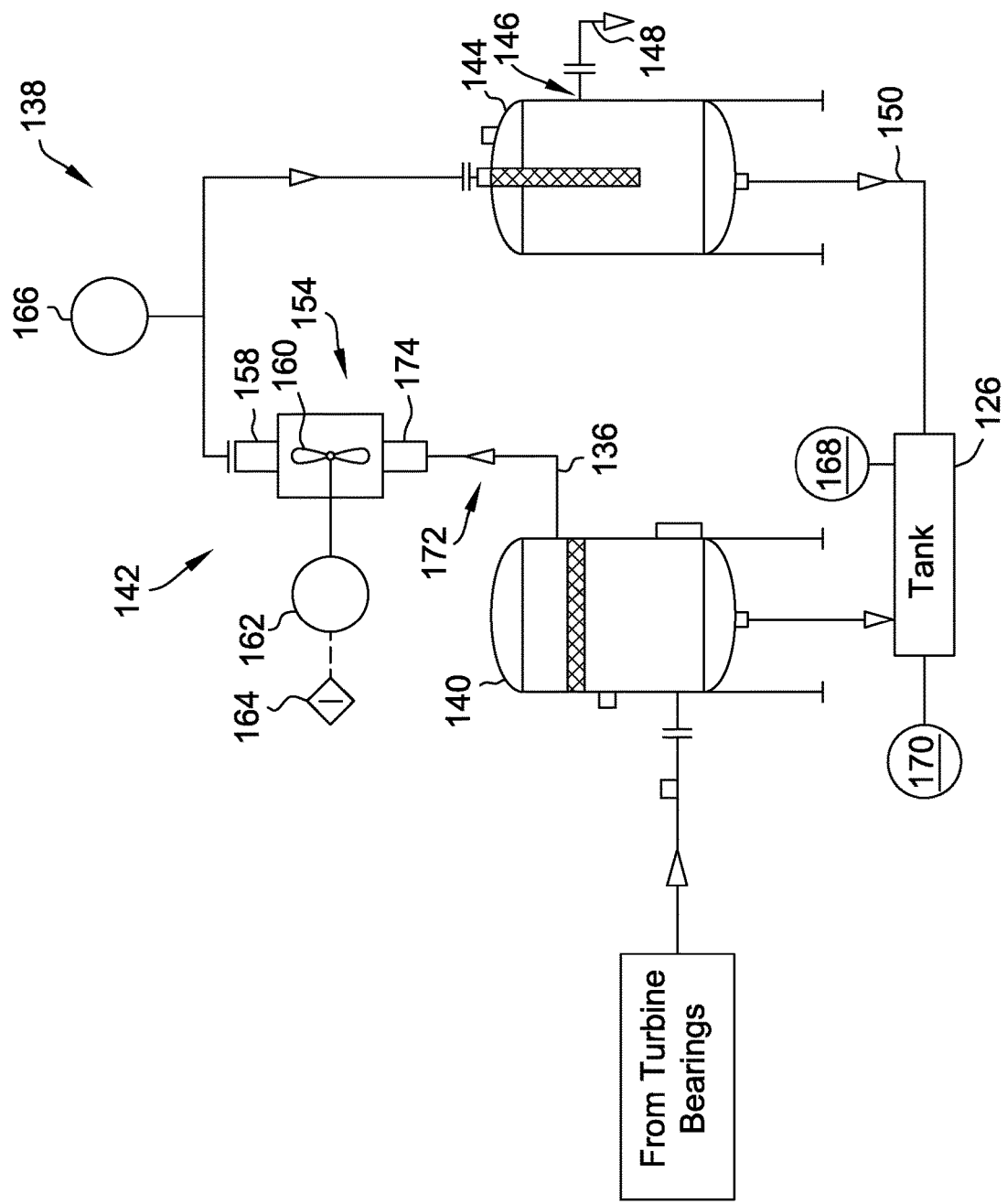
FIG. 2 is a schematic view of an exemplary mixed fluids separation system that may be used with the gas turbine assembly shown in FIG. 1.

FIG. 2 is a schematic view of vapor separation system 138 that may be used in gas turbine assembly 100 (shown in FIG. 1). In the exemplary embodiment, vapor separation system 138 includes a first separation tank 140 that receives oil-water mixture 136 from the turbine bearings. A cooler 142 is downstream from first separation tank 140, and a second separator tank 144 is downstream from cooler 142.

As will be described in more detail below, oil-water mixture 136 is channeled towards cooler 142 in a vaporized state. Cooler 142 is operable to cool oil-water vapor mixture 136 to a separation temperature that liquefies at least a portion of the oil in oil-water mixture 136, while maintaining at least a portion of the water in oil-water mixture in a vaporized state. Oil-water mixture 136 is then channeled towards second separator tank 144. Tank 144 includes a vent 146 for discharging vaporized water displaced by forced air or natural escaping, separated from the at least partially liquefied oil of oil-water mixture 136, in a first product stream 148 from separator tank 144. Thus, a first liquefied product stream 150, having a reduced water content, may be discharged from separator tank 144 and returned to tank 126 for further use in the operation of gas turbine assembly 100 (shown in FIG. 1), for example. Alternatively, at least partially liquefied oil of oil-water mixture 136 may be discharged from first separator tank 140 and returned to tank 126, for use in the operation of gas turbine assembly 100.

In the exemplary embodiment, cooler 142 includes a heat exchanger 154 having an inlet 174 that receives oil-water vapor mixture 136 from first separator tank 140, and an outlet 158 that discharges first product stream from cooler 142. Heat exchanger 154 includes a fan 160 that channels an airflow (not shown) through heat exchanger 154 to facilitate heat transfer between the airflow and oil-water mixture 136 channeled through heat exchanger. Specifically, heat is transferred from oil-water mixture 136 to the airflow to reduce the temperature of oil-water mixture 136 to the separation temperature. The separation temperature may be any temperature that enables at least a portion of the oil to liquify, while at least a portion of the water is maintained in a vaporized state. In other words, cooler 142 cools the oil to facilitate separation, but not to a temperature that causes water to condense. In some embodiments, the separation temperature is defined within a range of between about 212° F. to about 250° F. In alternative embodiments, coolers other than an air-cooled heat exchanger may be used to cool oil-water mixture 136.

Cooler heat extraction performance is controlled to maintain oil-water mixture 136 at the desired separation temperature. For example, in the exemplary embodiment, cooler 142 includes a motor 162 coupled to fan 160, and a controller 164 coupled to motor 162. In one embodiment, controller 164 is a variable frequency controller that is capable of dynamically adjusting operation of cooler 142 to facilitate maintaining air-oil-water mixture 136 at the separation temperature. That is, controller 164 is capable of varying the operational speed of motor 162, and fan 160 rotates to adjust the amount of cooling airflow directed towards air-oil-water mixture 136. In alternative embodiments, controller 164 selectively starts and stops operation of cooler 142 to maintain oil-water mixture 136 at the separation temperature. In further alternative embodiments, cooler 142 may have fixed specific performance while the oil-water vapor mixture flow rate is variable or be controlled via changing the flow rate or temperature of heat extracting fluid. A cooler 142 can be in any heat exchanging equipment that enables system 138 to function as described herein, and can be used with fixed or variable controller performance, or with variable modular size to facilitate achieving similar results.

Operation of motor 162 is controlled based on feedback received by controller 164 from one or more sensors within vapor separation system 138. For example, vapor separation system 138 may include a first sensor 166 at outlet 158 of cooler 142, a second sensor 168 at tank 126, and/or a third sensor 170 at tank 126. First sensor 166 monitors the temperature (i.e., the separation temperature) of oil-water mixture 136 discharged from outlet 158. Thus, operation of motor 162 may be controlled to maintain oil-water mixture 136 within a desired temperature range, as described above. Second sensor 168 monitors the water content in the oil tank 126. Third sensor 170 monitors a volume of liquid within tank 126, such as relative to at least one volumetric capacity threshold. Feedback from any of sensors 166, 168, and/or 170 may be used by controller 164 to verify separation of oil-water mixture 136 has occurred, while maintaining the economic efficiency of gas turbine assembly 100 as well as the separator performance. In an alternative embodiment, the air-oil-water vapor mixture can be cooled to facilitate efficient separation of the oil mist from air, while maintaining the temperature of the effluent above the water condensation temperature.

The embodiments described herein relate to power generation sites with high ambient humidity that use evaporative cooling and compressor spray intercooling (sprint) during operation thereof. In at least some known systems, lubricating oil may undesirably be contaminated with water, which can potentially cause turbine lube oil supply filter blockage, resulting in the triggering of high differential pressure alarms and potentially frequent filter replacement or cause the oil to oxidize prematurely or causes rusting issues or inefficient heat extraction from the gas turbine 100. The system described herein solves this problem by controlling the cooler performance, such as by varying the motor speed thru a Variable Frequency Driver (VFD), to enable water to evaporate during the recovery of the oil to the gas turbine. This results in reducing maintenance to the lubrication system, and may facilitate reducing the cooler motor load since VFD will be controlled based on ambient temperature and outlet oil temperature.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims.

Exemplary embodiments of vapor separation systems are described above in detail. The systems and methods described herein are not limited to the specific embodiments described herein, but rather, steps of the methods may be utilized independently and separately from other steps described herein. For example, the methods described herein are not limited to practice with the separation of mixtures found in gas turbine assemblies as described herein. Rather, the exemplary embodiment can be implemented and utilized in connection with any application the separation of a mixture into its substance parts is desired, whether the mixture exists in a vapor form or exists in liquid form and be heated to achieve the methods of separation mentioned in this invention.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

Further aspects of the invention are provided by the subject matter of the following clauses:

1. A vapor separation system comprising a cooler comprising an inlet oriented to receive an air-oil-water vapor mixture, and an outlet oriented to discharge the oil and water in different phases of matter from the cooler; a first sensor at the outlet of the cooler; and a controller communicatively coupled to the cooler, wherein the controller is configured to: receive temperature feedback from the first sensor; and cool, using the cooler and based on the temperature feedback, the oil-water mixture to a separation temperature that liquifies at least a portion of the oil in the air-oil-water mixture while maintaining at least a portion of the water in the air-oil-water mixture in a vaporized state.

2. The system of the preceding clause further comprising a second separator tank downstream from the cooler for receiving the air-oil-water mixture and condensed liquids from the cooler, wherein the separator tank comprises a vent for discharging the vaporized water and air separated from the liquefied oil.

3. The system in accordance with any preceding clause further comprising a return tank downstream from the second separator for receiving a liquefied product stream discharged from the separator tank.

4. The system in accordance with any preceding clause further comprising at least one of: a second sensor configured to monitor a water content of the liquefied product stream; and a third sensor configured to monitor a volume of liquid within the return tank, wherein the controller is configured to cool the air-oil-water mixture based on at least one of water content feedback, received from the second sensor, or volumetric feedback or oil water content feedback, received from the third sensor or any additional sensors to indicate the performance of the separating system.

5. The system in accordance with any preceding clause, wherein the controller is a variable frequency unit configured to dynamically adjust operation of the cooler to maintain the air-oil-water mixture at the separation temperature.

6. The system in accordance with any preceding clause, wherein the controller is configured to selectively start and stop operation of the cooler to facilitate maintaining the air-oil-water mixture at the separation temperature.

7. The system in accordance with any preceding clause, wherein the controller is configured to selectively start and stop operation of the cooler secondary heat extracting fluid mass flow rate, temperature or add or remove additional heat exchanger to facilitate maintaining the air-oil-water mixture at the separation temperature.

9. A gas turbine assembly comprising: a lubrication system; a turbine which draws an air-oil mixture from its bearings; and a vapor separation system comprising: a cooler comprising an inlet oriented to receive an air-oil-water mixture from the lubrication system, and an outlet oriented to discharge separated oil and water in two different phases of matter; a first sensor at the outlet of the cooler; and a controller communicatively coupled to the cooler, wherein the controller is configured to: receive temperature feedback from the first sensor; and cool, with the cooler and based on the temperature feedback, the air-oil-water mixture to a separation temperature to cause at least a portion of the oil in the air-oil-water mixture to liquify while maintaining at least a portion of the water in the air-oil-water mixture in a vaporized state.

10. The assembly in accordance with the preceding clause further comprising a water injection system configured to discharge water towards a main flow path of the gas turbine engine, wherein oil from the lubrication system and water from the water injection system form the air-oil-water mixture.

11. The assembly in accordance with any preceding clause further comprising a separator tank downstream from the cooler for receiving the air-oil-water mixture discharged from the cooler, wherein the separator tank comprises a vent configured to discharge vaporized water separated from the liquefied oil with or without residues of liquefied water.

12. The assembly in accordance with any preceding clause further comprising a return tank downstream from the separator tank for receiving a liquefied product stream discharged from the separator tank.

13. The assembly in accordance with any preceding clause further comprising at least one of: a second sensor configured to monitor a water content of the liquefied product stream; and a third sensor configured to monitor a volume of liquid within the return tank, wherein the controller is configured to increase or reduce cooling the air-oil-water mixture based on at least one of water content feedback, received from the second sensor, or volumetric feedback, received from the third sensor.

14. The assembly in accordance with any preceding clause, wherein the controller is a variable frequency unit configured to dynamically adjust operation of the cooler to maintain the air-oil-water mixture at the separation temperature.

15. The assembly in accordance with any preceding clause, wherein the controller is configured to selectively start and stop operation of the cooler to maintain the air-oil-water mixture at the separation temperature.

16. A vapor separation method comprising: channeling an air-oil-water mixture towards an inlet of a cooler; monitoring, with a first sensor, a temperature at an outlet of the cooler; receiving temperature feedback from the first sensor; and cooling, with the cooler and based on the temperature feedback, the air-oil-water mixture to a separation temperature to cause at least a portion of the oil in the air-oil-water mixture to liquify, while maintaining at least a portion of the water in the air-oil-water mixture in a vaporized state.

17. The method in accordance with the preceding clause, wherein channeling an air-oil-water mixture comprises channeling the air-oil-water mixture containing oil having a specific gravity that is within 10 or 20 percent of the specific gravity of water.

18. The method in accordance with any preceding clause further comprising forming the air-oil-water mixture from oil and water discharged from a gas turbine engine at elevated temperatures 19. The method in accordance with any preceding clause further comprising: channeling the air-oil-water mixture from the cooler to a separator tank; and venting, from the separator tank, the vaporized water separated from the liquefied oil.

20. The method in accordance with any preceding clause further comprising at least one of: dynamically adjusting, with a variable frequency unit, operation of the cooler to maintain the air-oil-water mixture at the separation temperature; selectively starting and stopping operation of the cooler to maintain the air-oil-water mixture at the separation temperature; and selectively changing at least one of the number of modular operation of coolers and the heat extracting fluid flow rate or temperature of the fluid to facilitate maintaining the air-oil-water mixture at the separation temperature.

While the invention has been described in terms of various specific embodiments, those skilled in the art will recognize that the invention can be practiced with modification within the spirit and scope of the claims

What is claimed is:

1. A vapor separation system comprising:
   a cooler comprising an inlet oriented to receive an air-oil-water vapor mixture, and an outlet oriented to discharge the oil and water in different phases of matter from the cooler;
   a separation tank downstream from the cooler for receiving the air-oil-water mixture and condensed liquids discharged from the cooler, wherein the separator tank comprises a vent for discharging vaporized water and air separated from the liquefied oil;
   a first sensor at the outlet of the cooler; and
   a controller communicatively coupled to the cooler, wherein the controller is configured to:
   receive temperature feedback from the first sensor; and
   cool, using the cooler and based on the temperature feedback, the air-oil-water mixture to a separation temperature that liquifies at least a portion of the oil in the air-oil-water mixture while maintaining at least a portion of the water in the air-oil-water mixture in a vaporized state.

2. The system in accordance with claim 1 further comprising a return tank downstream from the second separator for receiving a liquefied product stream discharged from the separator tank.

3. The system in accordance with claim 2 further comprising at least one of:
   a second sensor configured to monitor a water content of the liquefied product stream; and
   a third sensor configured to monitor a volume of liquid within the return tank, wherein the controller is configured to cool the air-oil-water mixture based on at least one of water content feedback, received from the second sensor, or volumetric feedback or oil water content feedback, received from the third sensor to indicate the performance of the vapor separating system.

4. The system in accordance with claim 1, wherein the controller is a variable frequency unit configured to dynamically adjust operation of the cooler to maintain the air-oil-water mixture at the separation temperature.

5. The system in accordance with claim 1, wherein the controller is configured to selectively start and stop operation of the cooler to facilitate maintaining the air-oil-water mixture at the separation temperature.

6. The system in accordance with claim 1, wherein the controller is configured to selectively start and stop operation of the cooler, adjust a mass flow rate of a heat extracting fluid of the cooler, and adjust a temperature of the heat extracting fluid, in order to facilitate maintaining the air-oil-water mixture at the separation temperature.

7. A gas turbine assembly comprising:
   a lubrication system;
   a turbine; and
   a vapor separation system which receives an air-oil-water mixture drawn from a bearing of the turbine, wherein the air-oil mixture is at a temperature above the vapor point of water comprising:

a cooler comprising an inlet oriented to receive an air-oil-water mixture from the lubrication system, and an outlet oriented to discharge separated oil and water in two different phases of matter;

a separation tank downstream from the cooler for receiving the air-oil-water mixture and condensed liquids discharged from the cooler, wherein the separator tank comprises a vent for discharging vaporized water and air separated from the liquefied oil;

a first sensor at the outlet of the cooler; and a controller communicatively coupled to the cooler, wherein the controller is configured to:
  receive temperature feedback from the first sensor; and
  cool, with the cooler and based on the temperature feedback, the air-oil-water mixture to a separation temperature to cause at least a portion of the oil in the air-oil-water mixture to liquify while maintaining at least a portion of the water in the air-oil-water mixture in a vaporized state.

8. The assembly in accordance with claim 7 further comprising a water injection system configured to discharge water towards a combustion air flow path of the turbine, wherein oil from the lubrication system and water from the water injection system form the air-oil-water mixture.

9. The assembly in accordance with claim 7 further comprising a return tank downstream from the separator tank for receiving a liquefied product stream discharged from the separator tank.

10. The assembly in accordance with claim 9 further comprising at least one of:
  a second sensor configured to monitor a water content of the liquefied product stream; and
  a third sensor configured to monitor a volume of liquid within the return tank, wherein the controller is configured to increase or reduce cooling the air-oil-water mixture based on at least one of water content feedback, received from the second sensor, or volumetric feedback, received from the third sensor.

11. The assembly in accordance with claim 7, wherein the controller is a variable frequency unit configured to dynamically adjust operation of the cooler to maintain the air-oil-water mixture at the separation temperature.

12. The assembly in accordance with claim 7, wherein the controller is configured to selectively start and stop operation of the cooler to maintain the air-oil-water mixture at the separation temperature.

13. A vapor separation method comprising:
channeling an air-oil-water mixture towards an inlet of a cooler;
monitoring, with a first sensor, a temperature at an outlet of the cooler;
receiving temperature feedback from the first sensor;
cooling, with the cooler and based on the temperature feedback, the air-oil-water mixture to a separation temperature to cause at least a portion of the oil in the air-oil-water mixture to liquify, while maintaining at least a portion of the water in the air-oil-water mixture in a vaporized state;
channeling the cooled air-oil-water mixture toward an inlet of a separator tank;
separating, using the separator tank, vaporized water and air mixture from liquefied oil; and
discharging, from the separator tank, the liquefied oil.

14. The method in accordance with claim 13, wherein channeling an air-oil-water mixture comprises channeling the air-oil-water mixture containing oil having a specific gravity that is approximately equal to that of water.

15. The method in accordance with claim 13 further comprising forming the air-oil-water mixture from oil and water discharged from a gas turbine engine at elevated temperatures.

16. The method in accordance with claim 13 further comprising:
venting, from the separator tank, the vaporized water separated from the liquefied oil.

17. The method in accordance with claim 13 further comprising at least one of:
dynamically adjusting, with a variable frequency unit, operation of the cooler to maintain the air-oil-water mixture at the separation temperature;
selectively starting and stopping operation of the cooler to maintain the air-oil-water mixture at the separation temperature; and
selectively changing at least one of operation of coolers, and a fluid flow rate of a heat extracting fluid of the cooler, and a temperature of the heat extracting fluid in order to facilitate maintaining the air-oil-water mixture at the separation temperature.

\* \* \* \* \*